United States Patent
Terasaki et al.

(10) Patent No.: US 6,876,354 B1
(45) Date of Patent: Apr. 5, 2005

(54) KEYBOARD TYPE INPUT DEVICE AND PORTABLE INFORMATION PROCESSOR

(75) Inventors: Kazuhisa Terasaki, Toyonaka (JP); Takeshi Ohyama, Tokyo (JP); Akihiro Yamada, Tokyo (JP); Gontaro Kitazumi, Tokyo (JP); Masanori Naritomi, Urayasu (JP); Kenji Nakamura, Mitaka (JP)

(73) Assignee: Link Evolution Co., Ltd., Tokyo (JP)

( * ) Notice: Subject to any disclaimer, the term of this patent is extended or adjusted under 35 U.S.C. 154(b) by 0 days.

(21) Appl. No.: 10/019,404

(22) PCT Filed: Dec. 8, 1999

(86) PCT No.: PCT/JP99/06883

§ 371 (c)(1),
(2), (4) Date: Dec. 28, 2001

(87) PCT Pub. No.: WO01/04736

PCT Pub. Date: Jan. 18, 2001

(30) Foreign Application Priority Data

Jul. 9, 1999 (JP) .......................................... 11-196459

(51) Int. Cl.$^7$ ................................................ G09G 5/00
(52) U.S. Cl. ........................ 345/168; 345/173; 400/472; 341/24
(58) Field of Search ................................. 345/156, 168, 345/169, 173, 157; 400/472, 493.1, 495.1; 200/5 A; 463/36–38; 273/148 B, 237, 238; 341/22, 24, 34

(56) References Cited

U.S. PATENT DOCUMENTS

| | | | | |
|---|---|---|---|---|
| 4,560,844 A | * | 12/1985 | Takamura et al. | 200/5 A |
| 4,977,298 A | * | 12/1990 | Fujiyama | 200/5 A |
| 5,053,585 A | | 10/1991 | Yaniger | |
| 5,907,375 A | * | 5/1999 | Nishikawa et al. | 349/12 |
| 5,967,898 A | * | 10/1999 | Takasaka et al. | 463/37 |
| 6,322,449 B1 | * | 11/2001 | Klitsner et al. | 463/37 |
| 6,362,953 B1 | * | 3/2002 | Ohlwine et al. | 361/681 |
| 6,388,660 B1 | * | 5/2002 | Manser et al. | 345/173 |

FOREIGN PATENT DOCUMENTS

| | | | |
|---|---|---|---|
| JP | 62-52622 | | 3/1987 |
| JP | 6-502507 | | 3/1994 |
| JP | 9-244815 | | 9/1997 |
| JP | 10-91305 | * | 4/1998 |
| JP | 10-233142 | | 9/1998 |
| JP | 11-65751 | * | 3/1999 |

* cited by examiner

*Primary Examiner*—Kent Chang
(74) *Attorney, Agent, or Firm*—Staas & Halsey LLP

(57) ABSTRACT

A key-board type input mechanism suitable for inputting large quantity of data is provided to a portable information technology device having a pen-input type display device. A keyboard (33 or 35) of the present invention comprises a key top panel portion (12 or 17) on which a plurality of input key portions (12*a* or 18) that are pressed down when carrying out a key input are integrally formed, a coordinate position information generating portion (13) and contact portions (16 or 19) for changing loads generated by pressing each input key portion of the key top panel portion down into a vertical load, a load distribution portion (14 or 20) for distributing unnecessary loads other than the vertical load changed by the coordinate position information generating portion and the contact portions, by deformation under a pressure. The key top panel portion, coordinate position information generating portion, contact portion, and load distribution portion are layered.

4 Claims, 12 Drawing Sheets

FIG.1
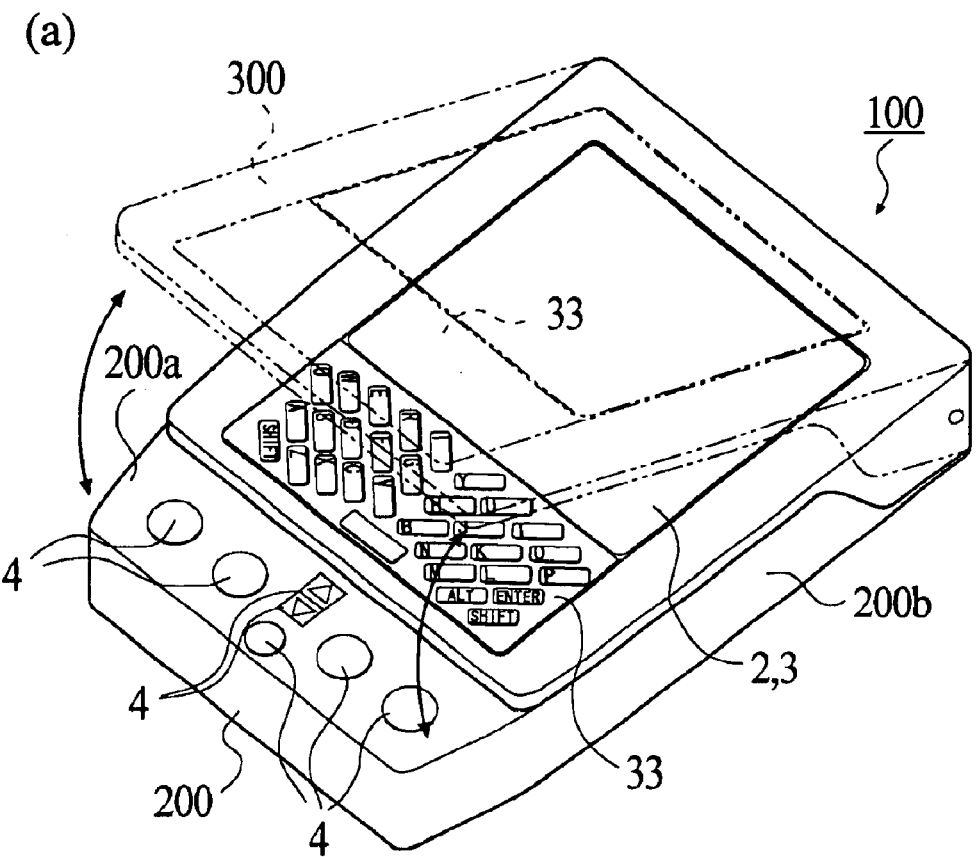
(a)
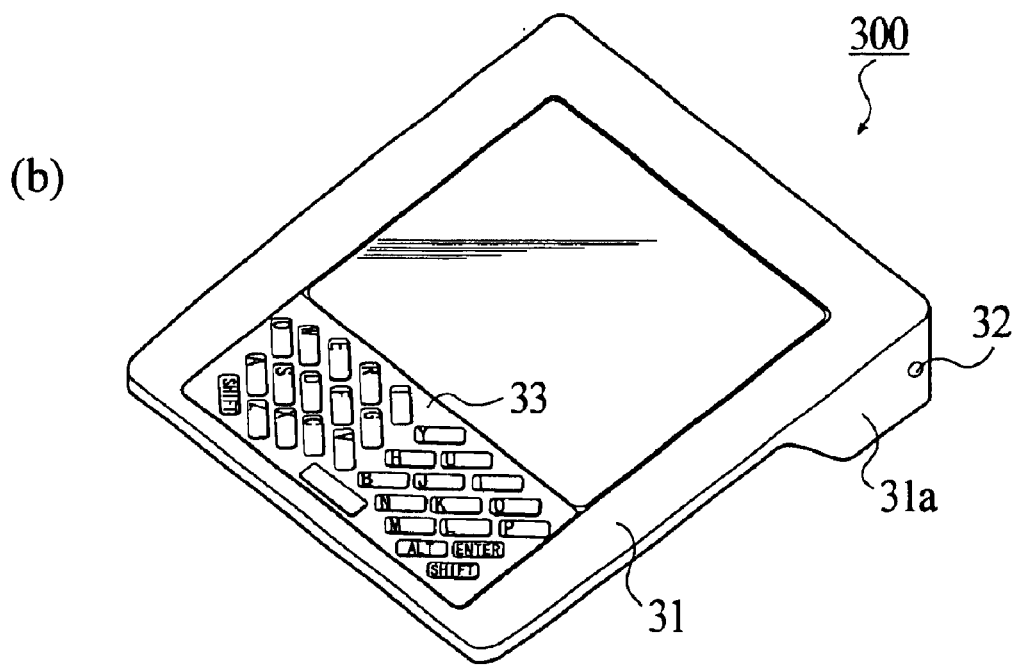
(b)

FIG.10

TABLE FOR TRANSFORMING FROM COORDINATES TO KEY CODE

| Index # | Key Code | TbX | TbY |
|---|---|---|---|
| 0 | 0x41 | 8 | 140 |
| 1 | 0x42 | 83 | 155 |
| 2 | 0x43 | 45 | 145 |
| ⋮ | ⋮ | ⋮ | ⋮ |
| 31 | 0x20 | 80 | 158 |

KEYBOARD TYPE INPUT DEVICE AND PORTABLE INFORMATION PROCESSOR

TECHNICAL FIELD

The present invention relates to a portable information technology device having a pen-input type display device.

BACKGROUND ART

In earlier technology, in a portable information technology device, such as a PDA (Personal Digital Assistant; an individual portable information terminal) or the like, a pen-input type display device which is constituted with a display unit, such as a liquid crystal display panel which is constituted integrally with a touch type sensor, and a pen input unit, such as a stylus pen or the like, is widely used as devices which perform a man-machine interface.

This is because the pen-input type display device can be operated easily even if it is a user who does not have high skill. Further, it is because the pen-input display unit can be provided cheaply since the internal mechanism of the pen-input type display device is comparatively easy configuration.

Incidentally, as shown in FIG. 13, in a PDA 400, as a method for inputting data, such as characters, patterns or the like, there is a method of selecting a pattern or character defined as a software keyboard 22 displayed on a liquid crystal display panel 21, by a pen 23, or a method of writing directly a character or pattern or the like on a predetermined input area 24 of the liquid crystal display panel 21 with the pen 23.

Further, for inputting large quantity of data, as an extended input unit of the pen-input type display device, a keyboard in which an electronic circuit is built in is used by connecting to the PDA 400 with a cable or the like.

However, there were the following problems in the data input method by the pen-input type display device which is carried in the above PDA 400 in earlier technology.

The method of clicking a pattern or character defined as the software keyboard 22 displayed on the liquid crystal display panel 21, with the pen 23 is not suitable for inputting large quantity of data because it takes time to input the data. Moreover, in the liquid crystal display panel 21, since the display area of the software keyboard 22 becomes large, the area for carrying out other applications becomes narrow. Therefore, operationality will deteriorate.

The method of inputting a character or pattern or the like by writing it directly on the predetermined input area 24 is not suitable for inputting large quantity of data because it takes time to input the data. Further, since the capacity of program which recognizes the character from the inputted data becomes large, the capacity of memory which is to be built in the PDA 400 becomes large. Therefore, there was a problem that the manufacturing cost of the PDA 400 would be raised.

Further, because of structural defects of the keyboard used as an extended input unit of a pen-input type display device, it was difficult for lightening and miniaturizing the keyboard. Therefore, it was difficult to carry the keyboard with the PDA 400.

It is an object of the present invention to provide a key-board type auxiliary input mechanism which is suitable for inputting large quantity of data to a portable information technology device having a pen-input type display device.

DISCLOSURE OF INVENTION

A key-board type input device according to the present invention comprises: an input key panel (for example, corresponding to a key top panel portion 12a shown in FIG. 4; a key top panel portion 17 shown in FIG. 6) on which a plurality of key tops (for example, which corresponds to a input key portion 12a shown in FIG. 4; a input key portion 18 shown in FIG. 6) that can be pressed down to carry out a key input are integrally formed; a press-down panel (for example, corresponding to a coordinate position information generating portion 13 shown in FIG. 4; a contact portion 16 shown in FIG. 6) for changing loads generated by pressing each key top of the input key panel down, into a vertical load; and a load distribution panel (for example, corresponding to a load distribution portion 14 shown in FIG. 4; a load distribution portion 20 shown in FIG. 6) for distributing unnecessary loads other than the vertical load changed by the press-down panel, by deformation under a pressure. The input key panel, the press-down panel, and the load distribution panel are layered.

According to the key-board type input device, if each key top of the input key panel is pressed down when inputting, the press-down panel changes the load generated by pressing each key top down into a vertical load, and the load distribution panel pressurizes and deforms the unnecessary loads other than the vertical load so as to disperse the unnecessary loads.

Therefore, since the key-board type input device has a simple configuration, and does not have a complicated electronic circuit or the like in the inside, it can respond to needs of a user, such as miniaturizing and lightening of the key-board type input device. Therefore, the key-board type input device can be provided at further low cost. Further, since loads of various directions are changed into the vertical load by the press-down panel, and the loads which are unnecessary for a key input are dispersed by a load distribution panel, accuracy of key input can be improved and mishit can be prevented.

A portable information technology device (for example, corresponding to a portable information technology device 100 shown in FIG. 1; a portable information technology device 150 shown in FIG. 5) according to the present invention is a portable information technology device having a touch panel (for example, corresponding to a touch panel 3 shown in FIG. 1; a touch panel 3 shown in FIG. 5), and a control unit for processing position information inputted in the touch panel, comprising: the above-described key-board type input device (for example, a keyboard 33 shown in FIG. 1; a keyboard 35 shown in FIG. 5) which is placed on the touch panel, for inputting the position information into the touch panel.

According to the portable information technology device, a touch panel, and a control unit for processing position information inputted in the touch panel are provided. The above-described key-board type input device is placed on the touch panel, and the position information is inputted by the key-board type input device.

Therefore, a key-board type input device suitable for inputting large quantity of data to a portable information technology device can be provided. Further, since the key-board type input device is simple in mechanism, and does not need a complicated electronic circuit or the like in the inside, it can respond to miniaturizing and lightening of the portable information technology device. Moreover, the key-board type input device can be provided at further low cost.

Further, in attachment of the key-board type input device, electrical wiring or the like is unnecessary. What is necessary is just to place the key-board type input device on the touch panel. Therefore, the key-board type Input device can be attached easily, and the key-board type input device is easily detachable.

In the portable information technology device, it may further comprise a cover member (for example, a cover 300 shown in FIG. 1) attached to the portable information technology device so as to cover the touch panel. The cover member is opened and shut freely. The key-board type input device may be formed integrally with the cover member, and the position information may be inputted in the touch panel by the key-board type input device when the cover member is shut.

According to the portable information technology device, a cover member may be attached to the portable information technology device, being opened and shut freely. When the cover member is shut, position information may be inputted to the touch panel by the key-board type input device formed integrally with the cover member.

Therefore, with the opening and shutting action of the cover member which is attached to the portable information technology device, being opened and shut freely, an input by the key-board type input device and a pen input can be changed easily. Further, since the key-board type input device is formed integrally with the cover member, strength of the key-board type input device can be raised.

Further, in the portable information technology device according to the present invention, the control unit may comprise: a key code storage unit (for example, corresponding to a key code transform table shown in FIG. 10) for storing position information and a key code corresponding to the position information inputted in the touch panel by the key-board type input device; a position information correction unit (for example, corresponding to a step S5 in a flowchart shown in FIG. 8; a step S31 and step S32 in a flowchart of "position information correction processing" shown in FIG. 11) for correcting the position information stored in the key code storage unit by corrected coordinates which are calculated by comparing the position information inputted in the touch panel at first and the position information stored in the key code storage unit; a position information specifying unit (for example, corresponding to a step S9 and step S11 in the flowchart shown in FIG. 8; a step S41 to a step S44 in a flowchart of "point delete processing" shown in FIG. 12) for specifying position information inputted at last from a plurality of the position information inputted in the touch panel; and a key code output unit (for example, a step S4 and a step S12 in the flowchart shown in FIG. 8; a step S21 to a step S23 in a flowchart of "key code transform processing" shown in FIG. 9) for outputting a key code corresponding to the position information specified by the position information specifying unit from the key code storage unit.

According to the portable information technology device, in the control unit, the key code storage unit stores position information and a key code corresponding to the position information inputted in the touch panel by the key-board input device. The position information correction unit calculates corrected coordinates by comparing the position information inputted in the touch panel at first and the position information stored in the key code storage unit, and corrects the position information stored in the key code storage unit by the calculated corrected coordinates. The position information specifying unit specifies position information inputted at last from a plurality of the position information inputted in the touch panel. The key code output unit outputs a key code corresponding to the position information specified by the position information specifying unit.

Therefore, in the touch panel, an input of position information by the key-board type input device may become possible. Further, since an error of position information with change of drive voltage or temperature change may be corrected by the position information correction unit, accuracy of position information inputted in the touch panel may improve.

Further, when a plurality of position information are inputted in the touch panel, although each position information cannot be detected in the touch panel, the same function as a usual keyboard which is used in a personal computer or the like can be carried out with the key-board type input device by specifying the position information inputted at last from a plurality of the position information by the position information specifying unit.

BRIEF DESCRIPTION OF DRAWINGS

FIG. 1 is a view showing a portable information technology device 100 having a key-board type auxiliary input mechanism to which the present invention is applied, wherein (a) is a whole appearance perspective view, and (b) is an appearance perspective view of a cover 300;

FIG. 10 is a key code transform table in which a key code corresponding to input coordinates is prescribed;

PREFERRED EMBODIMENT OF THE INVENTION

Figure 2:
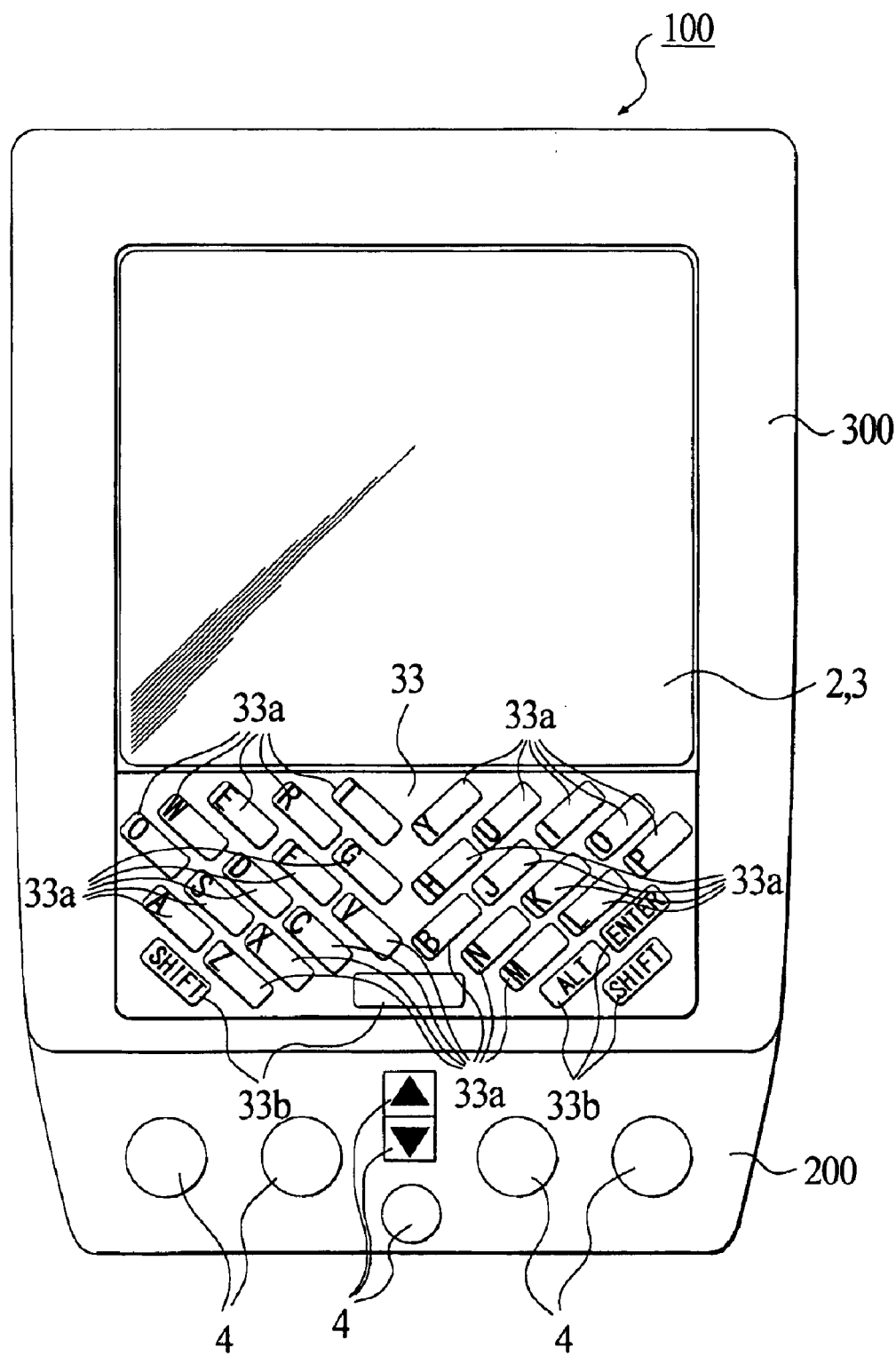
FIG. 2 is a front view showing the portable information technology device 100 having the key-board type auxiliary input mechanism to which the present invention is applied.

Hereinafter, an embodiment according to the present invention will be explained in detail with reference to FIGS. 1 to 12.

FIG. 1 is a view showing a portable information technology device 100 having a key-board type auxiliary input mechanism to which the present invention is applied, wherein (a) is a whole appearance perspective view, and (b) is a perspective view of a cover 300.

As shown in FIG. 1(a), the portable information technology device 100 comprises a main body 200 and the cover 300.

Here, the main body 200 comprises an LCD (Liquid Crystal Display) 2, a touch panel 3 formed integrally on the LCD 2, a key input unit 4, and the cover 300 which covers the LCD 2 portion, and which is opened and shut freely, on the top face 200a of the main body in the figure.

Further, as shown in FIG. 1(b), the cover 300 mainly comprises a frame 31 made of plastic, and a key-board type keyboard 33 formed integrally on the frame 31. Here, the keyboard 33 does not have special key caps but has a key structure similar to the keyboard which is generally used in a personal computer or the like (for example, alphabet keys 33a, 33a, . . . , and function keys 33b, 33b, . . . ), as a front view shown in FIG. 2. The keyboard 33 has a key pitch and stroke in consideration of an input by a thumb.

In addition, the method for attaching the keyboard 33 on the frame 31 is arbitrary. The keyboard 33 may be attached by adhering it on the frame 31, or the keyboard 33 may be attached detachably on the frame 31 by making it a fit-into type.

Further, in both left and right side faces 31a and 31a of the frame 31, hole portions 32 and 32 are provided (c.f. FIG. 1(b)), respectively. The cover 300 can be attached to the main body 200 by fitting the hole portions 32 and 32 into protrusions of side faces 200b of the main body 200, which is not shown in the figure. The cover 300 is opened and shut freely.

Figure 3:
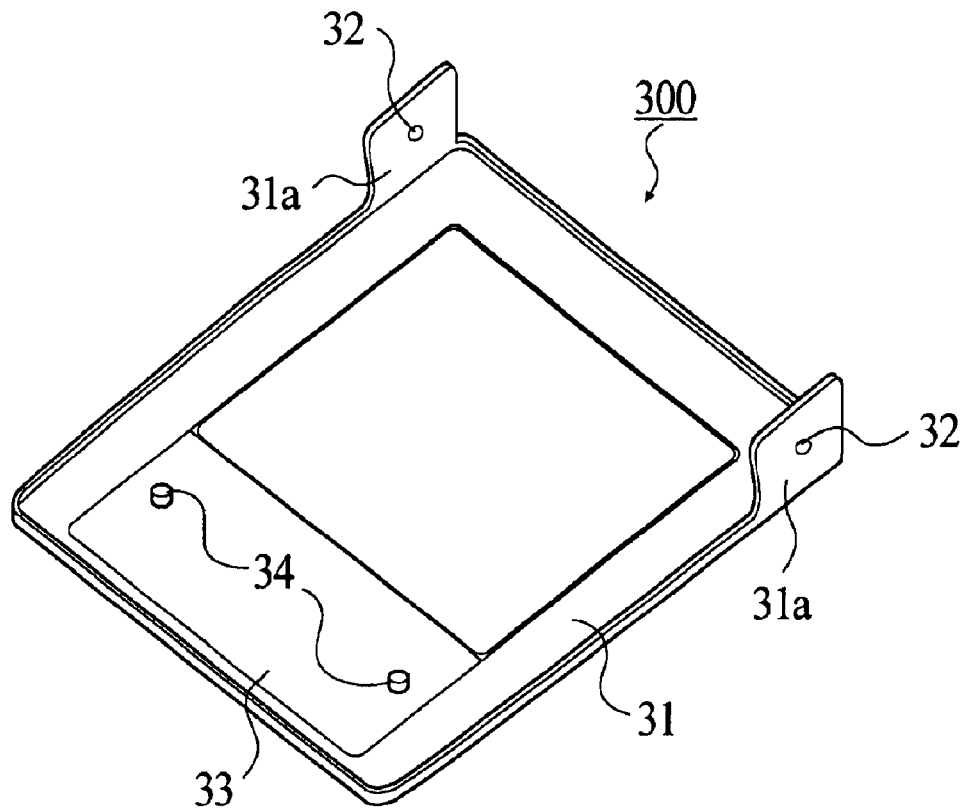
FIG. 3 is an appearance perspective view showing a rear surface of the cover 300.

Further, as shown in FIG. 3, in the rear surface of the keyboard 33, a pair of protruding portions 34 and 34 are provided. When shutting the cover 300 attached on the main body 200, which is opened and shut freely, the protruding portions 34 and 34 press down a position sensor (not shown in the figure) of the touch panel 3 on the LCD 2 of the main body 200. Then, this becomes a trigger and activates the program, so that the keyboard 33 is recognized. Therefore, it becomes possible to input a key by using the keyboard 33.

Here, the protruding portions 34 have a mechanism that they become in a convex state when the cover 300 is opened, that is, when the keyboard 33 is detached from the touch panel 3. When the cover 300 is shut, that is, when the keyboard 33 is attached on the touch panel 3, after pressing down temporarily the touch panel 3, the protruding portions 34 become in a concave state so as to release the pushing pressure.

In addition, when using a keyboard having a different key structure from the keyboard 33 shown in FIG. 2, information given to the non-shown position sensor of the touch panel 3 by position change of the protruding portions 34, or the like, may be changed, and kinds of the keyboard 33 may be distinguished. Moreover, by distinguishing and recognizing a plurality of keyboards, they can be used simultaneously. In addition, setting of the kinds of keyboard 33, or the like, may be carried out by inputting the kinds with a pen on the touch panel 3 of the main body 200.

Figure 4:
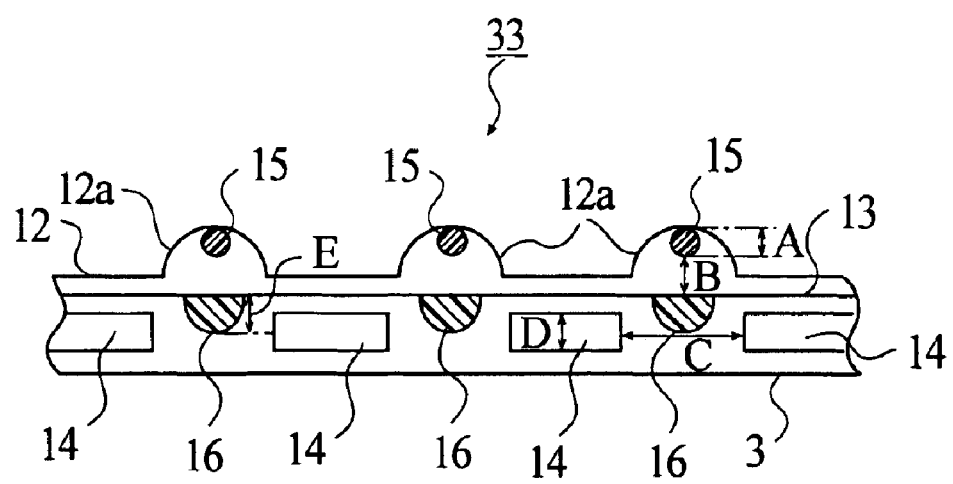
FIG. 4 is a sectional view showing an internal structure of a keyboard 33.

Next, a cross section structure of the keyboard 33 will be explained with reference to FIG. 4. FIG. 4 is a sectional view showing an internal structure of the keyboard 33. As shown in the figure, the keyboard 33 mainly comprises a key top panel portion 12, a coordinate position information generating portion 13, and a load distribution portion 14.

The key top panel portion 12 is a sheet-like resin having a plurality of input key portions 12a and 12a . . . which are formed in hemispherical corresponding to the key structure of the keyboard 33 (alphabet keys 33a, 33a, . . . , and function keys 33b, 33b, . . . ) shown in FIG. 2. The key top panel portion 12 is adhered to the coordinate position generating portion 13 by using an adhesive sheet (not shown in the figure) or the like. In the inside of each input key portion 12a, a spherical pressure transmit portion 15 which is made of epoxy resin or the like is formed integrally with the key input portion 12a.

In addition, although the key top panel portion 12 is a sheet-like resin, its material is arbitrary. For example, the key-board may be made by using materials, such as rubber gum, resign plastic, metal or the like.

Here, the click sensation when pressing down each input key portion 12a of the key top panel portion 12 and a keystroke B can be adjusted by changing a diameter A of each pressure transmit portion 15 (c.f. FIG. 4).

The coordinate position information generating portion 13 is, for example, a mylar sheet with a thickness of about 0.13 mm. On the rear surface of the coordinate position information generating portion 13, a plurality of contact portions 16 and 16, . . . having a hemispherical shape with a height E of about 0.5 to 0.8 mm are formed integrally. Here, each contact portion 16 is made of epoxy resin or the like, and corresponds to each pressure transmit portion 15 formed in each input key portion 12a of the key top panel portion 12.

The coordinate position information generating portion 13 changes loads generated by pressing down each input key portion 12a of the key top panel portion 12 into a vertical load by the contact portions 16. Then, the coordinate position information generating portion 13 transmits the vertical load to the touch panel 3. Here, by changing loads from various directions into the vertical load by the contact portion 16, the contact position with the touch panel 3 becomes more accurate.

The load distribution portion 14 is, for example, a foamed sponge sheet with a thickness D of about 1 mm. In the portion corresponding to each input key portion 12a, a round opening portion with a caliber C of about 3 to 4 φ is formed. The load distribution portion 14 is adhered to the coordinate position information generating portion 13 by using an adhesive sheet (not shown in the figure) or the like. Here, the condition of the material or thickness D of the load distribution portion 14, or the shape or caliber C of the opening portion of the load distribution portion 14, or the like, can be suitably changed according to a use condition.

The load distribution portion 14 distributes unnecessary loads for a key input, which are generated in the vicinity of the coordinate position information generating portion 13, by deformation under a pressure when an arbitrary input key portion 12a of the key top panel portion 12 is pressed down. Then, the load distribution portion 14 prevents mishit in the touch panel 3 by damping the unnecessary loads to a pressure which does not reach a threshold value that the touch panel 3 recognizes a key input.

Further, in the case of carrying out a key input by using the keyboard 33, when an arbitrary input key portion 12a of the key top panel portion 12 is pressed down by a user, the pressure transmit portion 15 transmits the pressed-down pressure to the coordinate position information generating portion 13. Here, the pressed-down pressure transmitted to the coordinate position information generating portion 13 includes not only the load from vertical direction but also loads from various directions.

Next, the pressed-down pressure is changed into the vertical load by the contact portion 16 of the coordinate position information generating portion 13. Then, when the contact portion 16 contacts the touch panel 3, position information is generated. Here, the contact portion 16 is in contact with the touch panel 3 by the pressure more than a threshold value that the touch panel 3 recognizes a key input. Further, the position information unit the X and Y coordinates of the touch panel 3, where the contact portion 16 is in contact.

Then, the position information is outputted to a CPU 1 of later-described control system, and an input by the keyboard 33 is carried out.

In the above-described FIG. 1 to FIG. 4, the configuration of the portable information technology device 100, and the key-board type keyboard 33 which is formed integrally on the frame 31 of the cover 300 of the portable information technology device 100, and the cross section structure of the keyboard 33 were mainly explained. However, as shown in FIG. 5, it may be a structure that the cover 300 is not used and a keyboard 35 is directly stuck on the LCD 2 of the main body 200.

Figure 5:
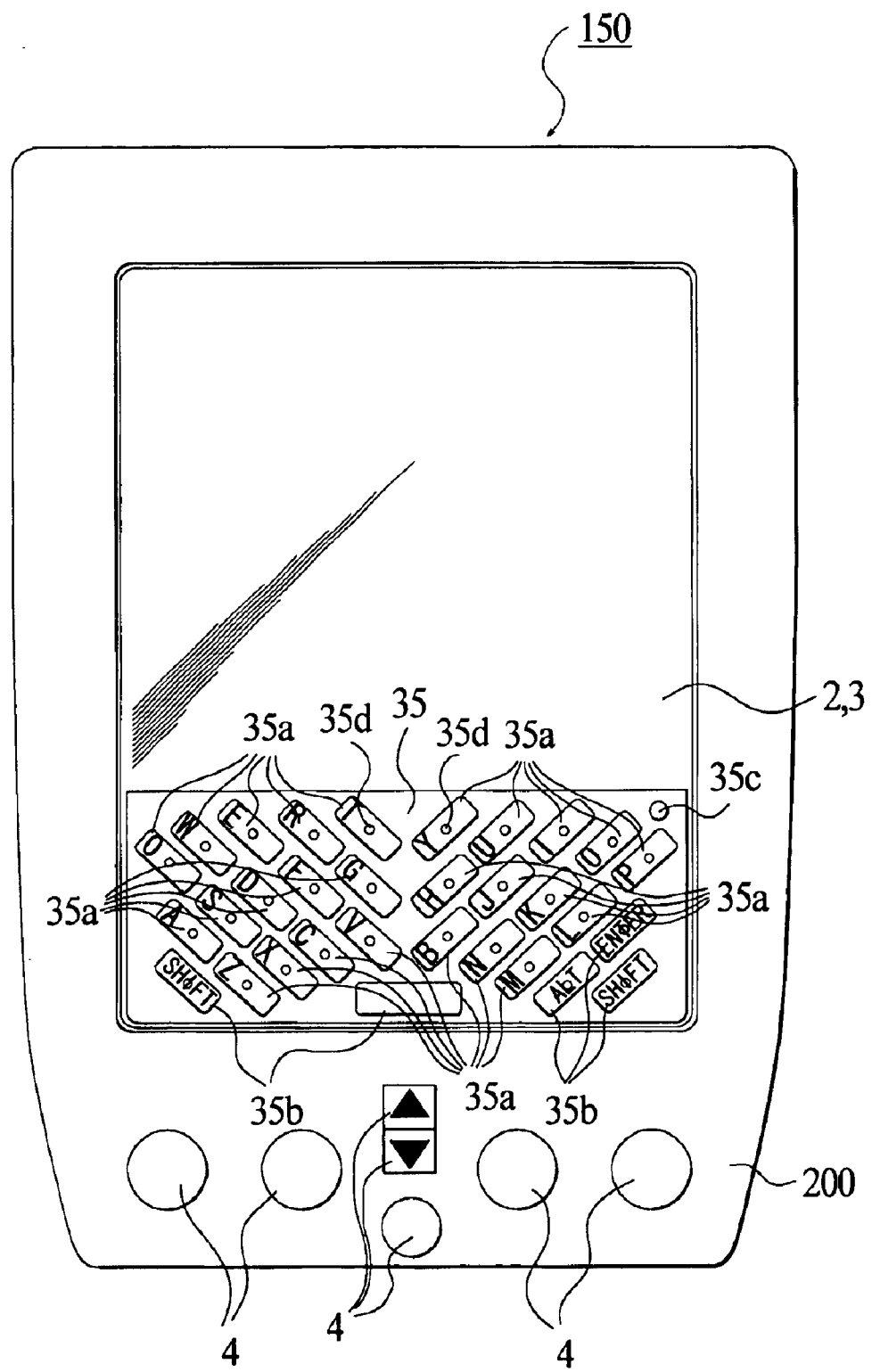
FIG. 5 is a front view showing a portable information technology device 150 having the key-board type auxiliary input mechanism to which the present invention is applied.

FIG. 5 is a front view showing the portable information technology device 150 having the key-board type auxiliary input mechanism to which the present invention is applied. As shown in FIG. 5, the portable information technology device 150 comprises the main body 200, and the key-board type keyboard 35.

The main body 200 is the same as the main body 200 shown in FIG. 1(a), so that the explanation is omitted here.

Figure 6:
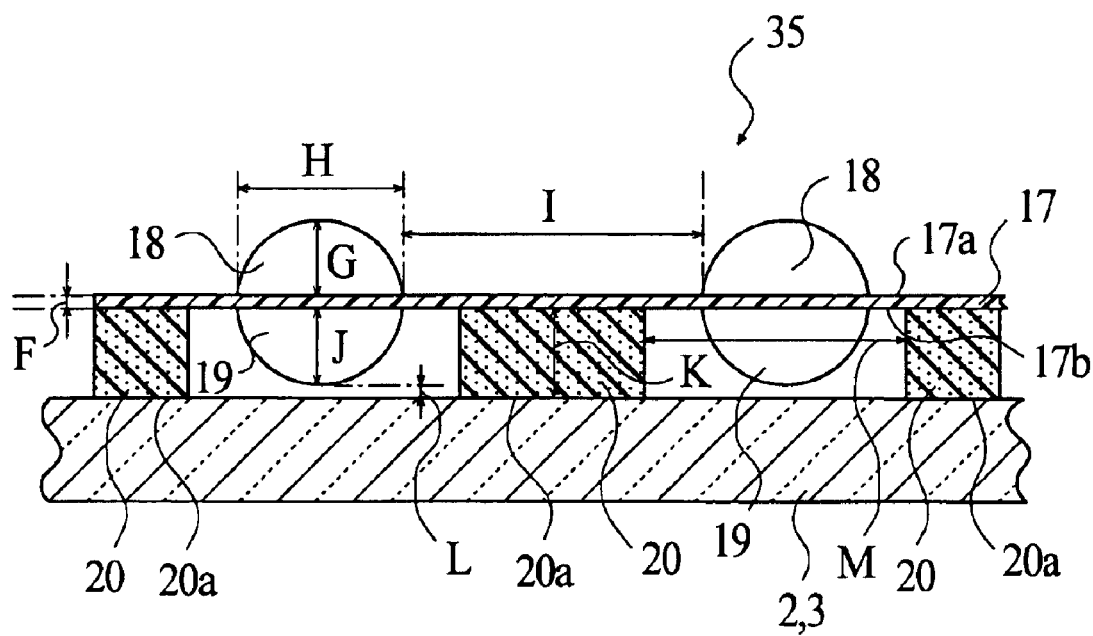
FIG. 6 is a sectional view showing an internal structure of a keyboard 35.

The keyboard 35 has almost the same key structure as the keyboard 33 shown in FIG. 2, and comprises a plurality of alphabet keys 35a and 35a, . . . , and a plurality of function keys 35b and 35b, . . . . Further, although the details will be described later, each above-described key is printed on a key top panel portion 17 (c.f. FIG. 6). When carrying out a key input, a key top 35d corresponding to each key is pressed down by a user. The target key top 35d is pressed down precisely before pressing the adjacent key tops down by providing the key tops 35d.

Further, the dissimilarity between the keyboard 35 and the keyboard 33 is that the keyboard 35 further comprises an on/off key 35c. In the keyboard 33, a pair of protruding portions 34 and 34 (c.f. FIG. 3) provided on the rear surface of the keyboard 33 presses the touch panel 2 down, and the main body 200 is made to recognize the keyboard 33, so that an input by the keyboard 33 becomes possible. On the other hand, in the keyboard 35, a user presses the on/off key 35c down, so that the enable/disable of a character input by the keyboard 35 is switched.

FIG. 6 is a view showing a cross section structure of the keyboard 35. Here, the keyboard 35 is a key-board type keyboard that the keyboard 33 shown in FIG. 2 is simplified. It is a keyboard having more practical configuration.

In FIG. 6, the keyboard 35 mainly comprises the key top panel portion 17, input key portions 18, contact portions 19, and a load distribution portion 20.

The key top panel portion 17 is a PET sheet with a thickness F of about 100 $\mu$m (=0.1 mm), or the like. On the front surface 17a of the key top panel portion 17, a plurality of hemispherical input key portions 18 and 18, . . . corresponding to the key tops 35d shown in FIG. 5 are formed integrally. Further, on the rear surface 17b, the input keys (alphabet keys 35a, . . . , and function keys 35b, or the like, shown in FIG. 5) are printed by silk printing or the like. Moreover, on the rear surface 17b, a plurality of hemispherical contact portions 19 and 19, . . . are formed by the same forming method as the input key portions 18.

The input key portions 18 correspond to the key tops 35d of the keyboard 35 shown in FIG. 5, and is a hemispherical epoxy resin or the like formed integrally on the front surface 17a of the key top panel portion 17. Here, the height G of the input key portions 18 is about 0.6 mm, and the diameter H thereof is about 1.5 mm. Further, on the front surface 17a of the key top panel portion 17, the distance I between the adjacent input key portions 18 is 5 to 6 mm.

When an input key portion 18 is pressed down by a user, its loads are transmitted to the contact portion 19.

The contact portions 19 are hemispherical epoxy resins or the like with a shape similar to the tip portion of a stylus pen (not shown in the figure) for tapping on the touch panel 3. The contact portions 19 are formed in positions corresponding to the input key portions 18 on the rear surface 17b of the key top panel portion 17. Here, the height J of the contact portions 19 is about 0.5 mm, and the diameter H is about 1.5 mm. Further, as for forming of the contact portions 19, a method of using a metal mold that is the same as the input key portions 18 is used.

The contact portions 19 change the loads generated by pressing down the input key portions 18 into the load of vertical direction, and transmit the vertical load to the touch panel 3.

The load distribution portion 20 is, for example, sponge material with a thickness K of about 0.65 mm. On the contact face 20a with the touch panel 2, an adsorption surface processing for having adsorptivity to a flat face of a glass or the like is performed. Further, the load distribution portion 20 is adhered to the rear surface 17b of the key top panel portion 17 by using an adhesive sheet (not shown in the figure) or the like. In the portions corresponding to the contact portions 19, opening portions with a caliber M of about 3 to 4$\phi$ are formed similarly as the load distribution portion 14 of the keyboard 33 (c.f. FIG. 4).

When the input key portions 18 are pressed down, the load distribution portion 20 distributes unnecessary loads for a key input, which are generated in the vicinity of the contact portions 19, by deformation under a pressure. Then, the load distribution portion 20 damps the unnecessary loads to a pressure that the touch panel 3 does not recognize a key input. Thereby, mishit in the touch panel 3 is prevented.

Next, a character input by using the keyboard 35 will be explained with reference to FIG. 5 and FIG. 6.

At first, as shown in FIG. 5, after sticking the keyboard 35 on the touch panel 2 of the main body 200, a user presses the on/off key 35c down. Thereby, a character input by the keyboard 35 becomes possible. In addition, in the main body 200, a program for recognizing the keyboard 35 is stored.

Next, when an arbitrary input key portion 18 (c.f. FIG. 16) is pressed down by a user, the load distribution portion 20 in periphery of the input key portion 18 is contracted and deformed, and the contact portion 19 is pressed against the touch panel 2. At this time, the load distribution portion 20 in periphery of the contact portion 19 also causes a pushing pressure to the touch panel 2. However, the pushing pressure is dispersed around by elasticity of the load distribution portion 20, so that the pushing pressure is suppressed below a threshold value that the touch panel 2 recognizes a key input.

Then, in the touch panel 2, only position information of the contact portion 19 is outputted to the CPU 1 of the later-described control system, and a character input by the keyboard 35 is carried out.

Incidentally, the difference L (=K−J) between the thickness K of the load distribution portion 20 and the height J of the contact portion becomes a keystroke L (the elastic modulus of the load distribution portion 20 is also related, indeed). If the keystroke L is taken long, there is a possibility that the accuracy of coordinate input position of the contact portion 19 in the touch panel 2 is deteriorated by diagonal stress when the input key portion 18 is touched roughly. Further, stress of the load distribution portion 20 will also increase, and a strong pushing pressure from the contact face 20a of the load distribution portion 20 will be added to the touch panel 2.

On the other hand, if the keystroke L is taken short, the accuracy of the coordinate input position of the contact portion 19 in the touch panel 2 will improve. However, the coordinates may be inputted to the touch panel 3 even if the input key portion 18 is touched lightly with the inside of a finger.

When carrying out a key input, it is necessary to optimize the above-described keystroke L. As the result that a key input test is carried out by changing the keystroke L, the keystroke L selected in order to maintain a satisfactory hit sensation of the input key portions 18 and the accuracy of coordinate input positions of the contact portions 19 in the touch panel 2 is about 0.15 mm.

Further, in many cases, a usual sheet-like keyboard is used for switches which are not operated frequently. Therefore, the load of a touch of an input key is set comparatively heavy (about 5 g to 30 g).

In the keyboard 35, the key-touch load of the input key portions 18 is set about from 1 g to 3 g in consideration of deformation elasticity of the load distribution portion 20, and deformation elasticity of the input key portions 18 formed on the key top panel portion 17 and that of the contact portions 19.

In addition, in the keyboard 35, the height, diameter or the like of each configuration portion (the key top panel portion 17, the input key portions 18, the contact portions 19, and the load distribution portion 20) can be suitably changed according to the operating environment of the keyboard 35.

Next, a method for manufacturing the keyboard 35 will be explained.

Before the explanation, the above-described key top panel portion 17 comprises two PET sheets. Here, each PET sheet will be called a sheet 17A and sheet 17B (not shown in the figure). Further, in the following explanation, an expression of front surface and rear surface in each configuration portion is used. In FIG. 6, the face of top direction is front surface, and the face of bottom direction is rear surface.

At first, a plurality of input key portions 18 are formed on the front surface of the sheet 17A (17a in FIG. 6) by using a metal mold (not shown in the figure). Similarly, a plurality of contact portions 19 are formed on the rear surface of the sheet 17B (17b in FIG. 6). Here, the input key portions 18 and the contact portions 19 are formed (copied) on the PET sheets by dissolving epoxy resin in a metal mold having a plurality of hemispherical recesses (corresponding to the shapes of the input key portions 18 and the contact portions 19), by placing the PET sheets on the metal mold, and by cooling the sheets.

Usually, the input key portions 18 are formed by a technique called potting. However, the keyboard 35 is formed by using a metal mold having an accuracy of about 0.005 mm in order to secure stably the shape of the input key portions 18 having the key tops 35d.

Next, alphabet keys 35a, and functional keys 35b, . . . are printed on the rear surface of the sheet 17A by silk printing or the like.

Then, the rear surface of the sheet 17A and the front surface of the sheet 17B are stuck by an adhesive.

Next, about the load distribution portion 20 will be explained. Opening portions of about 3 φ are formed in the portions corresponding to a plurality of the contact portions 19 in the load distribution portion 20, respectively. Then, surface treatment for having absorptivity to a glass or the like is performed to the rear surface of the load distribution portion 20 (20a in FIG. 6). Then, the front surface of the load distribution portion 20 and the rear surface of the sheet 17B are adhered by an adhesive.

As described above, the keyboard 35 is manufactured.

Figure 7:
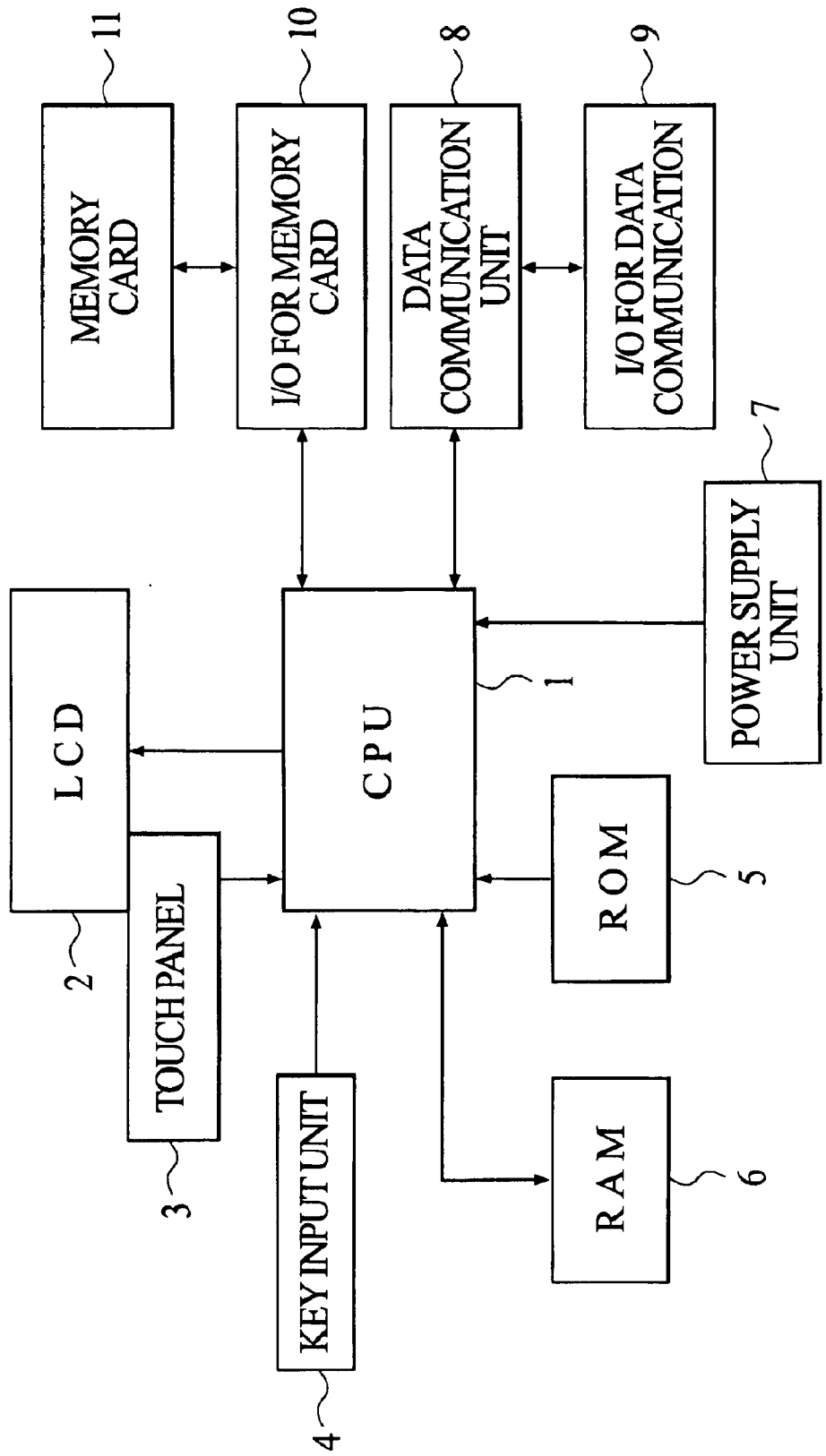
FIG. 7 is a block diagram showing a principal portion configuration of a control system of an inside of the portable information technology device 100 shown in FIG. 1 and the portable information technology device 150 shown in FIG. 5.

FIG. 7 is a block diagram showing a principal portion configuration of control systems of inside of the portable information technology device 100 shown in FIG. 1 and the portable information technology device 150 shown in FIG. 5. As shown in the figure, each of the portable information technology devices 100 and 150 comprises a CPU 1, an LCD 2, a touch panel 3, a key input unit 4, a ROM 5, a RAM 6, a power supply unit 7, a data communication unit 8, an I/O for data communication 9, an I/O for memory card 10, and a memory card 11.

The CPU (Central Processing Unit) 1 develops a system program and application program which are stored into the ROM 5 to a program storage area which is not shown in the figure, by indication inputted from the key input unit 4 after the power button of the key input unit 4 is turned ON. Then, the CPU 1 carries out a processing according to the program, from various indications or data inputted from the touch panel 3, stores the processing result into the RAM 6, and displays the result on the LCD 2. Further, the CPU 1 carries out read-out of the data from the memory card 11, while saving the processing data on the memory card 11 through the I/O for memory card 10. Further, the CPU 1 carries out data communication with a personal computer or information terminal or the like which are connected through the I/O for data communication 9.

Figure 9:
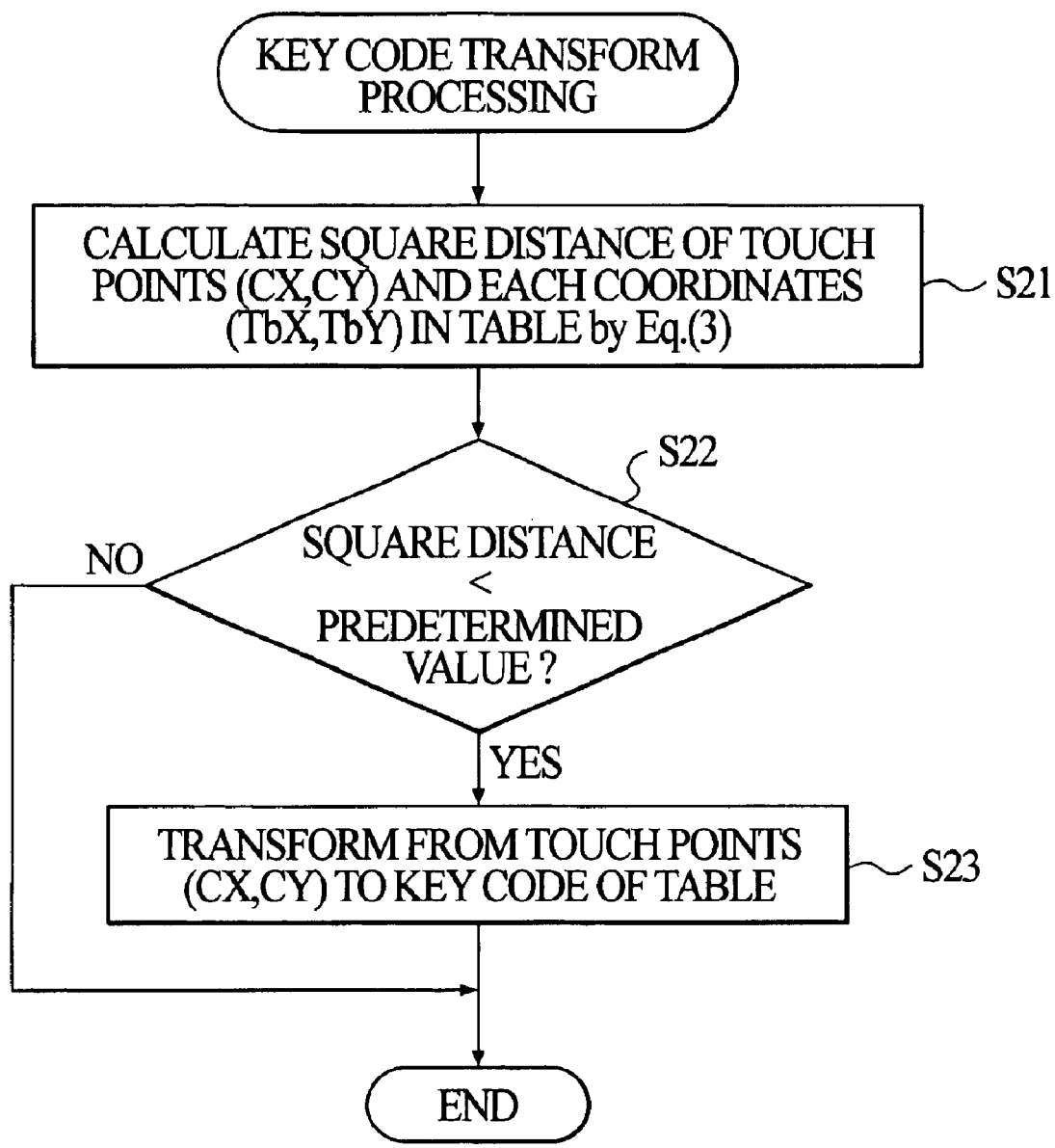
FIG. 9 is a flowchart showing a "key code transform processing" which is carried out in a step S4 and step S12 in FIG. 8.
Figure 11:
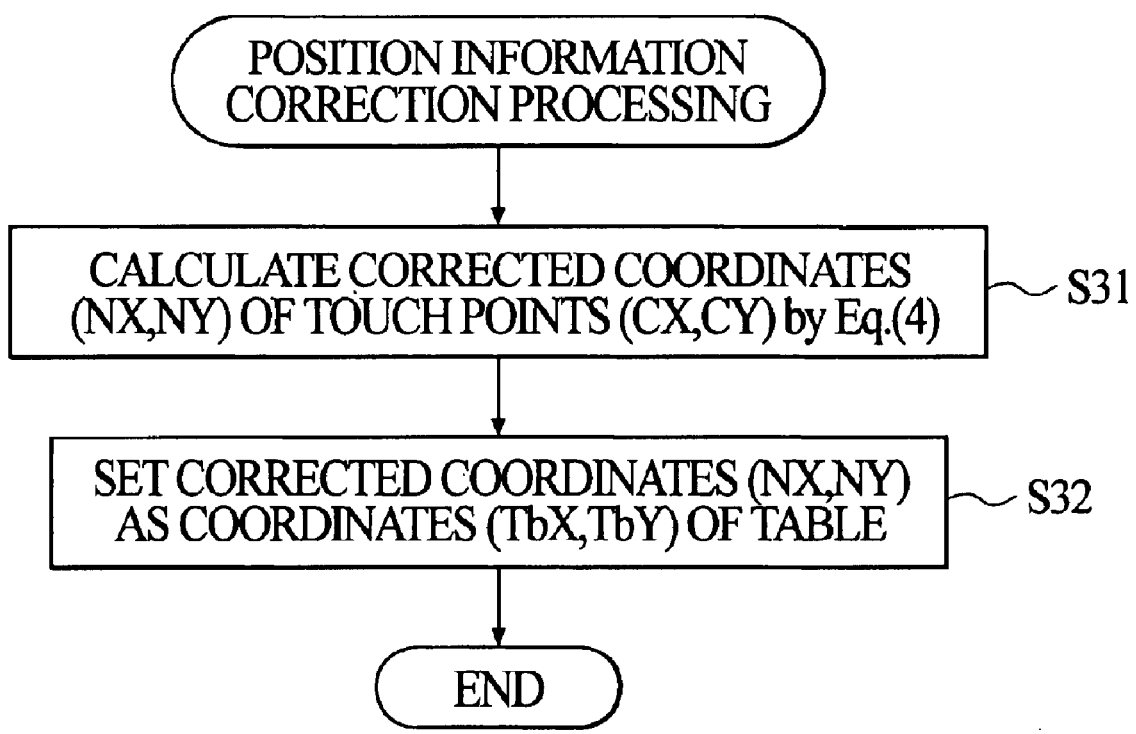
FIG. 11 is a flowchart showing a "position information correction processing" which is carried out in a step S5 in FIG. 8.

For example, when an alphabet key 33a of the keyboard 33 is pressed down and touch points (CX, CY) are inputted from the touch panel 3, and if no keys are pressed down before this input, the CPU 1 recognizes the touch points (CX, CY) as present coordinates (TX, TY). Then, the CPU 1 carries out later-described "key code transform processing" (c.f. FIG. 9), so that it transforms the touch points (CX, CY) into a key code which is prescribed in key code transform table (c.f. FIG. 10). Then, the CPU 1 carries out later-described "position information correction processing" (c.f. FIG. 11), so that it performs correction of coordinates which are prescribed in the key code transform table (TbX, TbY).

Further, when a key is pressed down before the touch points (CX, CY) are inputted, since the CPU 1 cannot specify individual coordinates when a plurality of points are pressed down because of the structure of the touch panel 3, the CPU 1 cannot specify the coordinates of the touch points (CX, CY). Therefore, the CPU 1 calculates error distance between the present coordinates (TX, TY) and the coordinates recognized last time (TXa, TYa) by the following Eq. (1).

$$\text{"error distance}=(TX-TXa)^2+(TY-TYa)^2\text{"} \qquad \text{Eq. (1)}$$

Here, the present coordinates (TX, TY) unit the mean value of n-numbers (n is an integer number of one or more) of the touch points which are pressed down on the touch panel 3 at the present.

Figure 12:
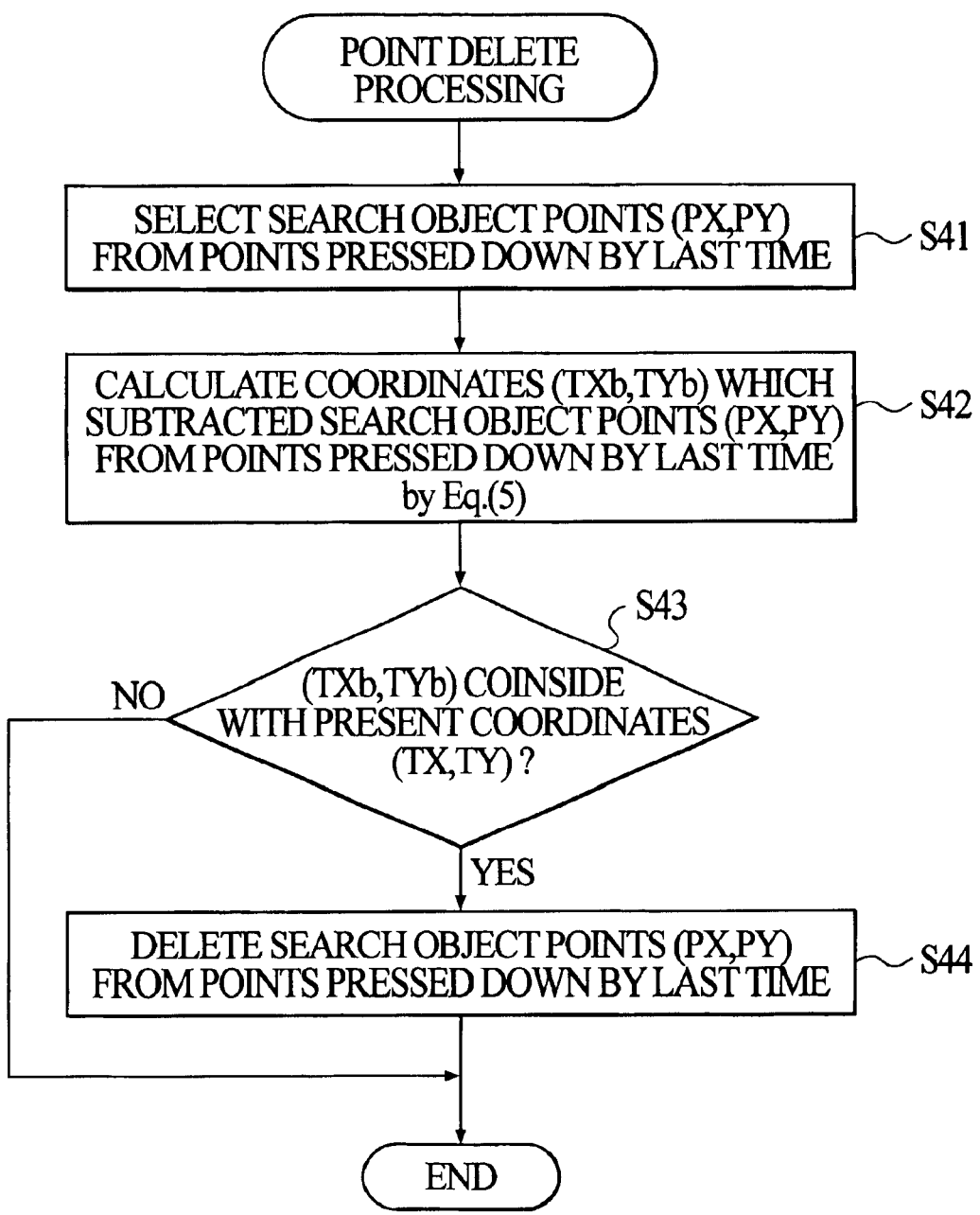
FIG. 12 is a flow chart showing a "point delete processing" which is carried out in a step S9 in FIG. 8.
Figure 13:
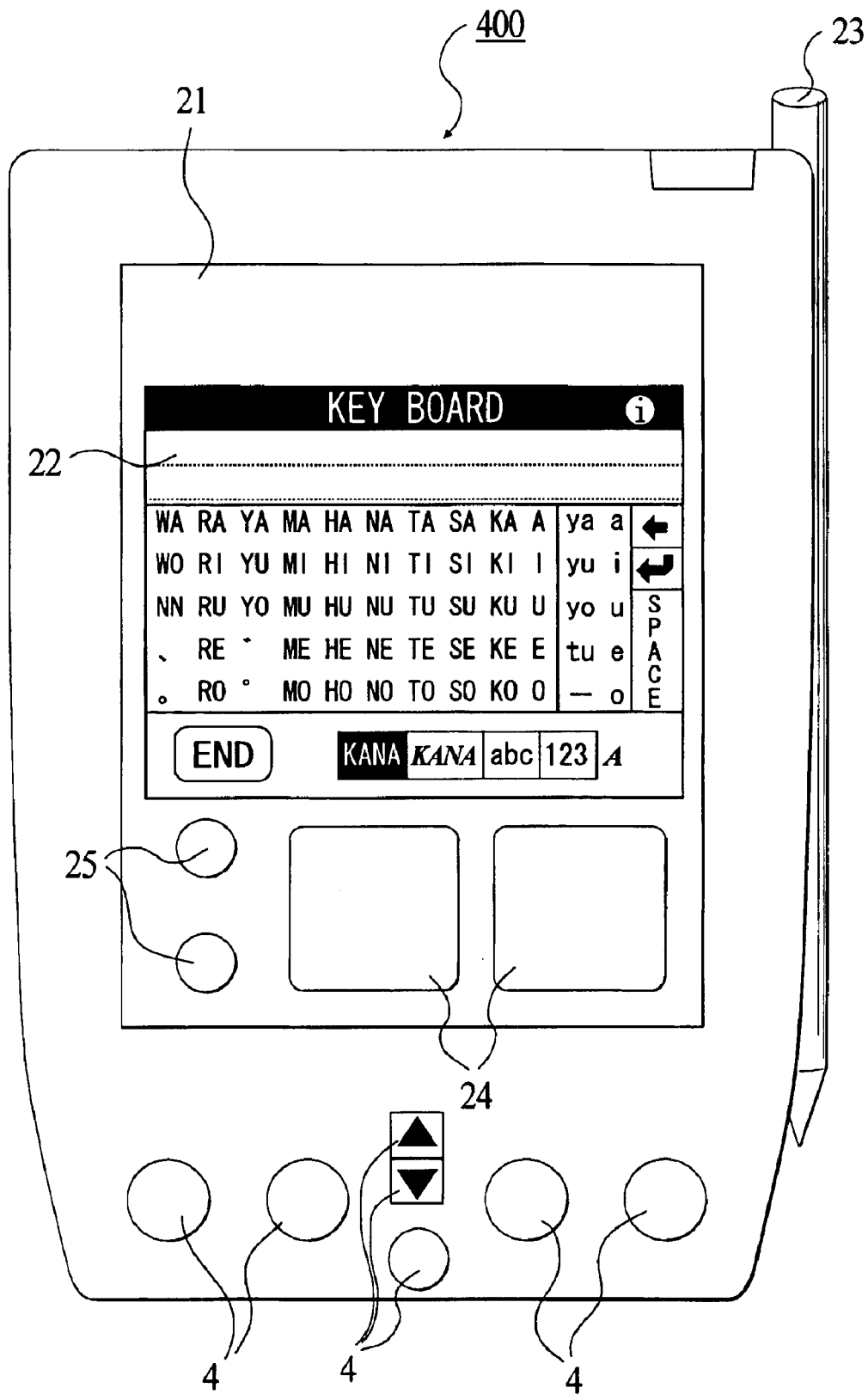
FIG. 13 is a front view showing a configuration of a PDA 400 in earlier technology.

Then, when the calculated error distance is smaller than a predetermined value which is determined beforehand, the CPU 1 ignores the input of the touch points (CX, CY). Further, when the calculated error distance is more than the predetermined value, the CPU 1 carries out later-described "point delete processing" (c.f. FIG. 12). If there is any point detached among the points pressed down last time, the point is deleted.

Here, the case that the error distance is smaller than the predetermined value unit the case that the coordinates transmitted from the touch panel 3 to the CPU 1 in the time when a state that the touch panel 3 is pressed down continues for a while are slightly different coordinates, for example, coordinates different for about 1 dot, by error of hardware, such as the touch panel 3 or the like.

Further, when there is no detached point and no points are deleted, the CPU 1 specifies the touch points (CX, CY) from the present coordinates (TX, TY) by the following Eq. (2).

$$\text{"}(CX, CY) = (TX, TY) * (\text{number of points pressed down by last time} + 1) - \Sigma (X \text{ and } Y \text{ coordinates pressed down by last time})\text{"}$$ Eq. (2)

Then, the CPU 1 carries out the "key code transform processing" (c.f. FIG. 9), and transforms the touch points (CX, CY) specified by Eq. (2) into a key code.

Further, in the "key code transform processing" (c.f. FIG. 9), the CPU 1 calculates square distance between the touch points, (CX, CY) and each coordinates (TbX, TbY) in the key code transform table in FIG. 10 by the following Eq. (3).

$$\text{"}(CX - TbX)^2 + (CY - TbY)^2\text{"}$$ Eq. (3)

Here, in the key code transform table shown in FIG. 10, a key code (Key Code) corresponding to each coordinates on the touch panel 3 (TbX, TbY) is stored.

Then, when the square distance calculated by Eq. (3) is smaller than a predetermined value which is determined beforehand, the CPU 1 transforms the touch points (CX, CY) into a key code in the table for transforming to key code in FIG. 10. Further, when the calculated square distance is more than the predetermined value, the CPU 1 does not perform transformation of the touch points (CX, CY) into a key code.

Further, in the "position information correction processing" (c.f. FIG. 11), the CPU 1 calculates corrected coordinates (NX, NY) corresponding to the touch points (CX, CY) by the following Eq. (4).

$$\text{"}(NX, NY) = ((X \text{ and } Y \text{ coordinates for comparison}) * (100 - \text{weighted value})) / 100 + (CX, CY) * (\text{weighted value}) / 100\text{"}$$ Eq. (4)

Here, the (X and Y coordinates for comparison) unit the coordinates prescribed in the key code transform table (TbX, TbY) in FIG. 10. Further, the (weighted value) unit the predetermined value (percentage) determined beforehand and it is a numeric number showing to what extent the coordinates of the touch points (CX, CY) pressed down this time in addition are relied on to the coordinates of the key code transform table (TbX, TbY).

Moreover, the CPU 1 sets the corrected coordinates (NX, NY) calculated by Eq. (4) as the coordinates of the key code transform table (TbX, TbY) in FIG. 10.

Further, in the "point delete processing" (c.f. FIG. 12), the CPU 1 selects search object points (PX, PY) from a plurality of points pressed down before the input of the touch points (CX, CY).

Next, the CPU 1 calculates the present coordinates (TXb, TYb) which subtracted the search object points (PX, PY) from a plurality of the points pressed down by last time by the following Eq. (5).

$$\text{"}(TXb, TYb) = (\Sigma(X \text{ and } Y \text{ coordinates pressed down by last time}) - (PX, PY)) / ((\text{number of points pressed down by last time} - 1))\text{"}$$ Eq. (5)

Then, when the coordinates calculated by Eq. (5) (TXb, TYb) coincides with the present coordinates (TX, TY), the CPU 1 deletes the search object points (PX, PY) from the points pressed down by last time. The CPU 1 carries out the "point delete processing to the whole points pressed down by last time.

The LCD (Liquid Crystal Display) 2 displays display data inputted from the CPU 1. Further, on the LCD 2, the touch panel 3 is formed integrally.

The touch panel 3 is formed integrally on the LCD 2, and has a position sensor (not shown in the figure). Then, the touch panel 3 outputs the position information inputted by a stylus pen (not shown in the figure) or the keyboard 33 or the like to the CPU 1.

The key input unit 4 comprises a power supply button, various function buttons, a screen scrolling button, a data communication button or the like. The key input unit 4 outputs a pressed-down signal of each button which is pressed down to the CPU 1.

In the ROM (Read Only Memory) 5, a system program carried out by the CPU 1, an application program, a key code transform table shown in FIG. 10 or the like are stored.

The RAM (Random Access Memory) 6 forms a memory area for developing various programs and various data, which are read out from the ROM 5, when the CPU 1 carries out the above-described program.

The power supply unit 7 builds an exchangeable battery in the inside, and provides power supply to each portion of the pen-input type display device 100. In addition, the power supply unit 7 may build a battery charge in the inside, and may charge by connecting with the external power supply.

The data communication unit 8 performs communication of data with a personal computer or information terminal or the like that is connected through the I/O for data communication 9.

The I/O for data communication 9 is connected to the data communication unit 8, and is an interface used when carrying out data communication with the personal computer or information terminal or the like.

The I/O for memory card 10 is an interface used for exchanging data with the memory card 11.

The memory card 11 is connected to the CPU 1 through the I/O for memory card 10, and stores data inputted by a user.

Incidentally, there is a problem that an error of coordinate position information will arise with change of drive voltage or temperature change or the like when carrying out a key input by using the key-board type keyboards 33 and 35. Furthermore, there is a problem that key rollover which the next input key will be pressed down before the pressed-down input key is detached will occur.

Further, there is a problem that a plurality of points cannot be detected as individual points when points of two or more spots are pressed down because of the structure of the touch panel 3.

Next, processing action of the CPU 1 of the control systems of the portable information technology devices 100 and 150 will be explained with reference to FIG. 8 to FIG. 12, including solving processing of these problems.

Figure 8:
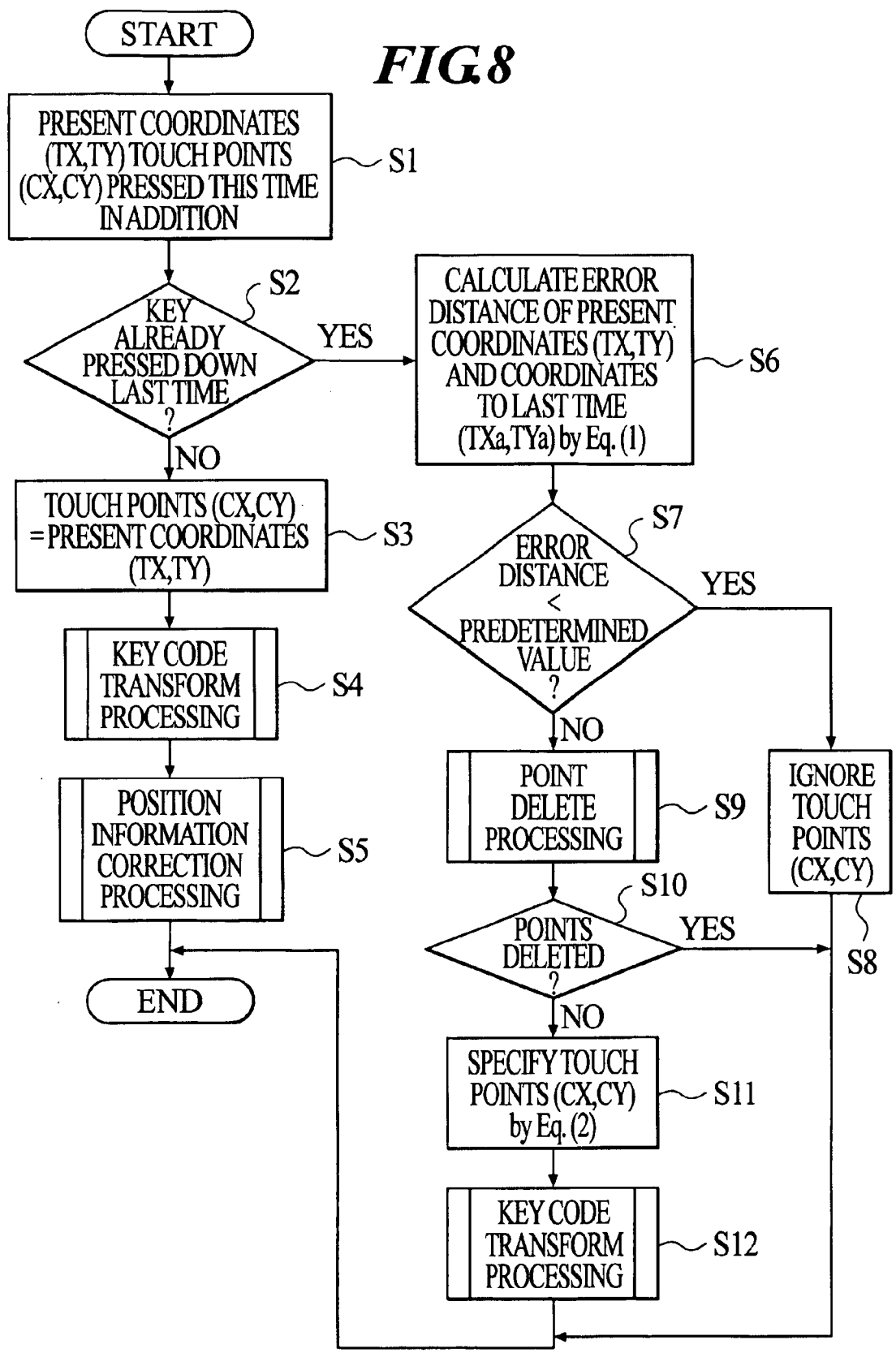
FIG. 8 is a flowchart showing an action of a CPU 1 of the control system of the portable information technology devices 100 and 150.

FIG. 8 is a flow chart showing an action of the CPU 1 of control system of the portable information technology devices 100 and 150.

When touch points (CX, CY) are pressed down this time in addition (step S1) in a state that recognizing the (TX, TY)

on the touch panel 3 as the present coordinates, the CPU 1 distinguishes whether a key has already been pressed down last time or not (step S2).

Then, if no keys are pressed down last time (step S2; NO), the CPU 1 recognizes the touch points (CX, CY) as the present coordinates (TX, TY) again (step S3).

Next, the CPU 1 carries out the "key code transform processing" shown in FIG. 9 (step S4), and transforms the touch points (CX, CY) into a key code.

Then, the CPU 1 carries out the "position information correction processing" shown in FIG. 11 (step S5), and performs correction of coordinate position information of the key code transform table (c.f. FIG. 10), so that the processing is ended.

On the other hand, in the step S2, if some keys are already pressed down last time (step S2; YES), the CPU 1 calculates the error distance between the present coordinates (TX, TY) and the coordinates to last time (TXa, TYa) by the following Eq. (1) (step S6). Here, the (TXa, TYa) unit the (TX, TY) before inputting the touch points (CX, CY).

$$\text{"error distance}=(TX-TXa)^2+(TY-TYa)^2\text{"} \qquad \text{Eq. (1)}$$

Then, the CPU 1 distinguished whether the error distance calculated in the step S6 is smaller than a predetermined value which is determined beforehand or not (step S7).

Here, when the calculated error distance is smaller than the predetermined value (step S7; YES), the CPU 1 ignores the input of the touch points (CX, CY) (step S8), so that the processing is ended.

Further, when the calculated error distance is more than the predetermined value (step S7; NO), the CPU 1 carries out the "point delete processing" Shown in FIG. 12 (step S9), and deletes the detached point among the points pressed down last time. Then, the CPU 1 distinguishes whether the point is deleted or not (step S10).

Here, when the point is deleted (step S10; YES), the CPU 1 ends the processing. Further, when the point is not deleted (step S10; NO), the CPU 1 specifies the touch points (CX, CY) by the following Eq. (2) (step S11).

$$(CX, CY)=(TX, TY)^*(\text{number of points pressed down by last time}+ 1)-\Sigma(X \text{ and } Y \text{ coordinates pressed down by last time})\text{"} \qquad \text{Eq. (2)}$$

Then, the CPU 1 carries out the "key code transform processing" shown in FIG. 9 (step S12), and transforms the touch points (CX, CY) into a key code, so that the processing is ended.

As described above, even if it is the case that a key has already been pressed down last time, the touch points (CX, CY) are specified, and the specified touch points (CX, CY) are transformed into a key code. Therefore, for example, when a shift key is pressed down last time, and if an alphabet key is pressed down this time, an alphabet of capital letter is inputted.

Thus, function which is carried out in a usual keyboard used in a personal computer or the like by pressing down a plurality of points at the same time can be carried out by the touch panel 3 and the key-board type keyboard 33.

FIG. 9 is a flow chart showing the "key code transform processing" carried out by the CPU 1, and FIG. 10 is a key code transform table in which a key code corresponding to input coordinates is prescribed. The "key code transform processing" carried out in the step S4 and step S12 in FIG. 8 will be explained with reference to FIG. 9 and FIG. 10.

At first, the CPU 1 calculates the square distance between the touch points (CX, CY) and each coordinates in the key code transform table (TbX, TbY) in FIG. 10 by the following Eq. (3) (step S21).

$$\text{"}(CX-TbX)^2+(CY-TbY)^2\text{"} \qquad \text{Eq. (3)}$$

Next, the CPU 1 distinguishes whether the square distance calculated in the step S21 is smaller than a predetermined value which is determined beforehand (step S22).

Here, when the square distance is smaller than the predetermined value (step S22; YES), the CPU 1 transforms the touch points (CX, CY) into a key code of the key code transform table in FIG. 10 (step S23), so that the processing is ended. Further, when the square distance is more than the predetermined value (step S22; NO), the CPU 1 ends the processing.

FIG. 11 is a flow chart showing the "position information correction processing" carried out by the CPU 1. The "position information correction processing" carried out in the step S5 in FIG. 8 will be explained with reference to the figure.

The CPU 1 calculates the corrected coordinates (NX, NY) corresponding to the touch points (CX, CY) by the following Eq. (4) (step S31).

$$\text{"}(NX, NY)=((X \text{ and } Y \text{ coordinates for comparison})^* (100\text{-weighted value}))/100+(CX, CY)^*(\text{weighted value})/100\text{"} \qquad \text{Eq. (4)}$$

Here, the (X and Y coordinates for comparison) is the coordinates prescribed in the key code transform table (TbX, TbY) in FIG. 10. Further, the (weighted value) is a predetermined value (percentage) determined beforehand, and is a numeric value showing to what extent the coordinates of the touch points (CX, CY) pressed down this time in addition are relied on to the coordinates of the key code transform table (TbX, TbY).

Then, the CPU 1 sets the corrected coordinates (NX, NY) calculated in the step S32 as the coordinates of the key code transform table (TbX, TbY) in FIG. 10 (step S33).

FIG. 12 is a flow chart showing the "point delete processing" carried out by the CPU 1. The "point delete processing" carried out in the step S9 in FIG. 8 will be explained with reference to the figure.

At first, the CPU 1 selects search object points (PX, PY) from a plurality of points pressed down by last time (step S41).

Next, the CPU 1 calculates the coordinates (X, Y) that the search object points (PX, PY) are subtracted from a plurality of the points pressed down by last time, by the following Eq. (5) (step S42).

$$\text{"}(X, Y)=(\Sigma (X \text{ and } Y \text{ coordinates pressed down by last time})-(PX, PY))/((\text{number of points pressed down by last time}-1))\text{"} \qquad \text{Eq. (5)}$$

Then, the CPU 1 distinguishes whether the coordinates calculated in the step S42 (X, Y) coincide with the present coordinates (TX, TY) (step S43).

Here, when the (X, Y) coincide with the present coordinates (TX, TY) (step S43; YES), the CPU 1 deletes the search object points (PX, PY) from the points pressed down by last time (step S44), and ends the processing. On the other hand, when the (X, Y) do not coincide with the present coordinates (TX, TY) (step S43; NO), the CPU 1 ends the processing.

Then, the CPU 1 carries out the "point delete processing" to the whole points pressed down by last time.

As described above, the cover 300 having the keyboard type keyboard 33 is attached on the main body 200 so as to be opened and shut freely to the main body 200, and the main body 200 is made to recognize the keyboard 33. Thereby, it becomes possible to input by the key-board type keyboard 33, so that a key-board type auxiliary input mechanism which is suitable for inputting large quantity of data can be provided to the portable information technology device 100 having a pen-input type display device.

Further, the key-board type keyboard 35 is stuck on the touch panel 3 on the LCD 2 of the main body 200, and the on/off key 35c is pressed down. Thereby, the main body 200 is made to recognize the keyboard 35, and it becomes possible to input a key by the key-board type keyboard 35. Therefore, a key-board type auxiliary input mechanism which is suitable for inputting large quantity of data can be provided to the portable information technology device 150 having a pen-input type display device.

Further, the keyboard 35 can be corresponding to miniaturizing and lightening of keyboard because it has a simple configuration. Therefore, the manufacturing cost of the keyboard can be further reduced.

In the keyboard 35, by making the height of the input key portions 18 into about 0.6 mm, and the diameter into 1.5 mm, the contact feeling of the inside of a finger for operating the input key portions 18 and the muscular strain when the input key portions 18 are pressed down can be obtained. Therefore, the input key portions 18 can be touched certainly.

Further, in the keyboard 35, the keyboard 35 becomes detachable to the touch panel 3 without limits by the surface processing given to the contact face 20a of the load distribution portion 20. Therefore, since an adhesive is not used, adhesion of foreign matter on the touch panel 3 and remaining of the stuck marks of the keyboard 35 can be prevented.

Further, in the keyboard 35, by setting the key-touch load of the input key portions 18 at 1 to 3 g, a user can carry out a character input continuously without feeling feebleness.

Then, since the key caps of the keyboards 33 and 35 are not special key caps but has the key structure similar to a keyboard that the user uses generally in a personal computer or the like, operationality of inputting data by the user is improved.

Further, a pair of the protruding portions 34 and 34 provided on the rear surface of the keyboard 33 presses down the position sensor of the touch panel 3 of the main body 200, and the program is activated so that the main body 200 will recognize the keyboard 33. Therefore, for example, kinds of the keyboard 33 can be recognized easily by changing the position of the protruding portions 34 and 34. Moreover, a plurality of keyboards can be recognized and used at the same time.

Further, in the cross section structure of the keyboard 33, the load distribution portion 14 for distributing unnecessary loads for a key input and the contact portions 16 for changing the pressed-down pressure of a key into the vertical load are provided. Thereby, mishit in the touch panel 3 can be prevented, and precise key input becomes possible. Further, in the cross section structure of the keyboard 35, since it comprises the load distribution portion 20 and the contact portions 19, the same effect can be obtained.

Further, by attaching a keyboard with the key top panel portion 12 on which Braille-points notations, such as price or destination or the like, are provided to touch panels of automatic ticket vendor of trains or airplanes or the like, visually handicapped people can also perform purchase operation of tickets in the touch panels easily.

Further, by putting the keyboard 33 on the arm or palm of a person who is hard of seeing and hearing, the person who is hard of seeing and hearing recognizes each input key on the keyboard 33. Thereby, it is possible to communicate with the person who is hard for seeing and hearing by utilizing the keyboard 33.

In addition, in the embodiment, it is not limited to contents of the above-described embodiment, but is suitably changeable in a range within the scope of the present invention. For example, the place where the keyboards 33 and 35 are attached is not limited to the touch panel 3 which is formed integrally on the LCD 2. It is applicable if it is a tablet-like input device comprising a sensor for recognizing coordinates, such as a pressure-sensitive type, electromagnetic induction method, capacitance, magnetostriction type, or the like.

Moreover, as for the concrete detail structure or the like of the keyboards 33 and 35, for example, it may have a structure for inducing magnetism according to the kinds of tablets. It is suitably changeable.

INDUSTRIAL APPLICABILITY

According to the present invention, a key-board type input device has a simple configuration, and does not have a complicated electronic circuit or the like in the inside. Therefore, it can respond to needs of a user, such as miniaturizing and lightening of the key-board type input device, and the key-board type input device can be provided at further low cost. Further, since loads of various directions are changed into a vertical load by a press-down panel, and loads which are unnecessary for a key input are dispersed by a load distribution panel, accuracy of key input can be improved and mishit can be prevented. Therefore, the key-board type input device of the present invention is particularly suitable for inputting data to a portable information technology device.

What is claimed is:

1. A key-board type input device comprising:

an input key panel on which a plurality of key tops are integrally formed, wherein each of the key tops can be pressed down to carry out a key input;

a press-down panel for changing loads generated when each key top of the input key panel is pressed down, into a vertical load; and a load distribution panel for distributing unnecessary loads other than the vertical load changed by the press-down panel, by deformation under a pressure;

wherein the input key panel, the press-down panel, and the load distribution panel are layered.

2. A portable information technology device comprising:

a touch panel;

a control unit for processing position information inputted in the touch panel; and the key-board type input device claimed in claim 1 which is placed on the touch panel, for inputting the position information into the touch panel.

3. The portable information technology device as claimed in claim 2, further comprising: a cover member attached to the portable information technology device so as to cover the touch panel, the cover member being opened and shut freely;

wherein the key-board type input device is formed integrally with the cover member, and the position information is inputted in the touch panel by the key-board type input device when the cover member is shut.

4. The portable information technology device as claimed in claim 2, wherein the control unit comprises:

a key code storage unit for storing position information and a key code which are corresponding to the position information inputted in the touch panel by the keyboard type input device;

a position information correction unit for correcting the position information stored in the key code storage unit by corrected coordinates, the corrected coordinates are calculated by comparing the position information inputted at first in the touch panel and the position information stored in the key code storage unit;

a position information specifying unit for specifying position information inputted at last from a plurality of the position information inputted in the touch panel; and a key code output unit for outputting a key code corresponding to the position information specified by the position information specifying unit, from the key code storage unit.

\* \* \* \* \*